(12) United States Patent
Ogino et al.

(10) Patent No.: US 8,107,007 B2
(45) Date of Patent: Jan. 31, 2012

(54) IMAGE PROCESSING APPARATUS

(75) Inventors: Masahiro Ogino, Yokohama (JP);
Yasutaka Tsuru, Kamakura (JP);
Yoshiaki Mizuhashi, Yokohama (JP);
Junichi Satoh, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 1366 days.

(21) Appl. No.: 11/646,405

(22) Filed: Dec. 28, 2006

(65) Prior Publication Data

US 2007/0273787 A1 Nov. 29, 2007

(30) Foreign Application Priority Data

May 23, 2006 (JP) ................................ 2006-142231

(51) Int. Cl.
*H04N 7/01* (2006.01)
(52) U.S. Cl. ................... 348/441; 348/452; 348/459
(58) Field of Classification Search .................. 348/441, 348/443, 446, 448, 459, 451, 452, 458; *H04N 7/01, H04N 11/20*
See application file for complete search history.

(56) References Cited

U.S. PATENT DOCUMENTS

| | | | |
|---|---|---|---|
| 5,216,505 A | 6/1993 | Kageyama et al. | |
| 6,108,379 A | 8/2000 | Shikakura et al. | |
| 6,493,466 B1 | 12/2002 | Honda et al. | |
| 6,560,272 B1 | 5/2003 | Komatsu | |
| 6,697,431 B1 | 2/2004 | Yoneyama | |
| 7,268,820 B2 * | 9/2007 | Honda et al. | 348/448 |
| 7,349,029 B1 * | 3/2008 | Chou | 348/448 |
| 7,420,618 B2 * | 9/2008 | Swartz | 348/448 |
| 2001/0036230 A1 | 11/2001 | Sugiyama | |
| 2002/0047919 A1 | 4/2002 | Kondo et al. | |
| 2002/0080881 A1 | 6/2002 | Honda et al. | |
| 2003/0031461 A1 | 2/2003 | Takayama | |
| 2003/0235393 A1 | 12/2003 | Boston et al. | |
| 2004/0101058 A1 | 5/2004 | Sasai et al. | |
| 2005/0151878 A1 | 7/2005 | Kasahara et al. | |
| 2005/0184949 A1 | 8/2005 | Kamimura | |
| 2007/0229703 A1 * | 10/2007 | Lu | 348/441 |

FOREIGN PATENT DOCUMENTS

JP 11-298861 A 10/1999

(Continued)

OTHER PUBLICATIONS

Japanese Office Action, w/ English translation of relevant portion, issued in Japanese Patent Application No. JP 2006-142231 dated Jun. 3, 2011.

*Primary Examiner* — Sherrie Hsia
(74) *Attorney, Agent, or Firm* — McDermott Will & Emery LLP

(57) ABSTRACT

A technique for flexibly converting the number of frames of a displayed image on the basis of a motion in the image or information of an image signal such as a program genre is provided. An image processing apparatus includes an input unit to which an image signal having a predetermined frame rate is input, an information acquirer for acquiring information concerning the input image signal, and a frame rate converter for converting the frame rate of the input image signal and outputting a resultant signal. The frame rate converter conducts the frame rate conversion of the input image signal on the basis of the information (such as the motion in the image or the program genre) of the input image signal acquired by the information acquirer.

13 Claims, 8 Drawing Sheets

FOREIGN PATENT DOCUMENTS

| | | |
|---|---|---|
| JP | 2001-109422 A | 4/2001 |
| JP | 2003-319378 A | 11/2003 |
| JP | 2004-180151 A | 6/2004 |
| JP | 2004-233949 | 8/2004 |
| JP | 2006-084758 | 3/2006 |
| JP | 2006-93840 A | 4/2006 |
| JP | 2006-129181 A | 5/2006 |
| JP | 2006-165602 A | 6/2006 |

* cited by examiner (a)

(b)

| PROGRAM GENRE | MOTION AMOUNT |
|---|---|
| NEWS & INFORMATION | SMALL |
| SPORT | LARGE |
| INFORMATION WIDE SHOW | SMALL |
| DRAMA | MEDIUM |
| MUSIC | SMALL |
| VARIETY | MEDIUM |
| MOVIE | LARGE |
| ANIMATION & SPECIAL FILMING | LARGE |
| DOCUMENTARY & CULTURE | MEDIUM |
| PERFORMANCE AT THEATER | SMALL |
| TASTE & EDUCATION | SMALL |
| WELFARE | SMALL |
| THE REST | SMALL |

IMAGE PROCESSING APPARATUS

INCORPORATION BY REFERENCE

The present application claims priority from Japanese application JP2006-142231 filed on May 23, 2006, the content of which is hereby incorporated by reference into this application.

BACKGROUND OF THE INVENTION

1. Field of the Invention

The present invention relates to an image processing apparatus having a configuration for converting a frame rate of an image signal.

2. Description of the Related Art

In general, the frame rate of the image displayed on an image processing apparatus such as a television set is 60 Hz. If the frame rate is up-converted to, for example, 120 Hz, the moving picture looks smoother. As for such frame rate conversion processing, for example, processing described in US2005/0184949A1 is known.

SUMMARY OF THE INVENTION

The frame rate up-conversion as described above is effective to the case where the motion is exhibited smoother in a scene having intense motions. However, the frame rate up-conversion is not effective in a scene having few motions such as a still picture.

In the technique described in US2005/0184949A1, the frame rate up-conversion processing is conducted regardless of the image state, such as whether the image is a moving picture or a still picture. In the technique described in US2005/0184949A1, therefore, the amount of signal processing that is not effective increases. In addition, since the display device (such as a PDP or an LCD) is always driven at a high frequency, the power consumption of the apparatus increases.

An object of the present invention is to provide a technique capable of converting the frame rate efficiently.

In accordance with the present invention, frame rate conversion processing is conducted on an input image signal having a predetermined frame rate on the basis of information concerning the input image signal.

The information concerning the image signal is, for example, a motion in the image. It is desirable to conduct frame rate up-conversion processing on a scene having a large motion. The information concerning the image signal is, for example, genre information of a program corresponding to the input image signal. The frame rate up-conversion processing may be conducted when the received program belongs to a specific genre (such as a sport or a movie).

The information concerning the image signal is, for example, information concerning the signal state of the input image signal, such as the receiving state, the transfer rate or the transmission bit error rate. When one of them is low, the frame rate may be lowered.

According to the present invention, the frame rate can be changed flexibly according to the image kind (such as the scene or motion amount) and the frame rate conversion can be conducted efficiently.

Other objects, features and advantages of the invention will become apparent from the following description of the embodiments of the invention taken in conjunction with the accompanying drawings.

DETAILED DESCRIPTION OF THE EMBODIMENTS

Hereafter, embodiments of the present invention will be described with reference to the drawings.

1. First Embodiment

Figure 1:
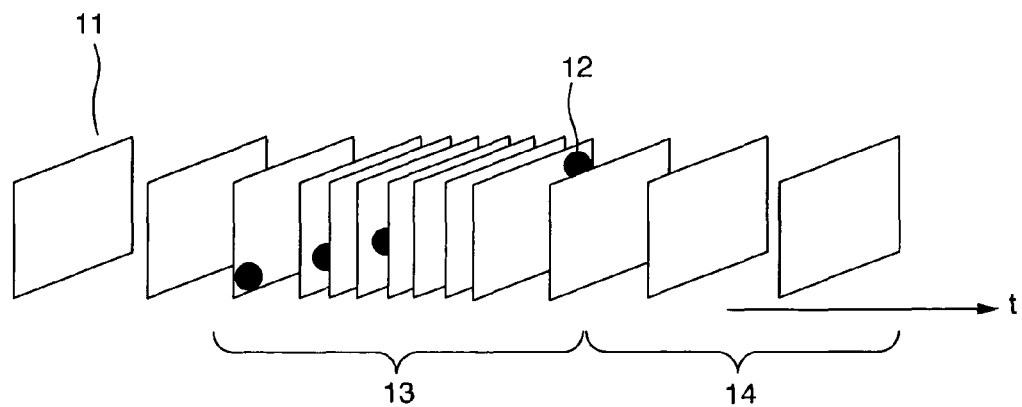
FIG. 1 is a diagram showing a concept of operation in a first embodiment.

First, the concept of the present embodiment will now be described with reference to FIG. 1. FIG. 1 shows a form of an image signal processed in the present embodiment. In the present embodiment, the input image signal has a predetermined frame rate, for example, a frame rate of 60 Hz. In FIG. 1, a frame sequence is denoted by a reference numeral 11. The present embodiment has the following feature: in the frame sequence 11 of the input image signal, a frame rate in a large-motion range 13 including a scene in which a motion of an object 12 is large is made larger than that in a small-motion range 14 having no motions or few motions. In other words, in the present embodiment, the frame rate of the input image signal is up-converted according to the image motion so as to locally raise the frame rate in the large-motion range in the image signal having a sequence of a plurality of frames.

In this way, the present embodiment saves power by conducting the frame rate conversion efficiently. The frame rate in the large-motion range 13 is 120 Hz, and the frame rate in the small-motion range 14 is set equal to 60 Hz which is the same as the frame rate of the input image signal.

A configuration example of an image processing apparatus according to the present embodiment for conducting the processing shown in FIG. 1 will now be described with reference to FIG. 2. The image processing apparatus shown in FIG. 2 represents an image display apparatus such as a television set including a display unit 28 such as a PDP or a CD.

Figure 2:
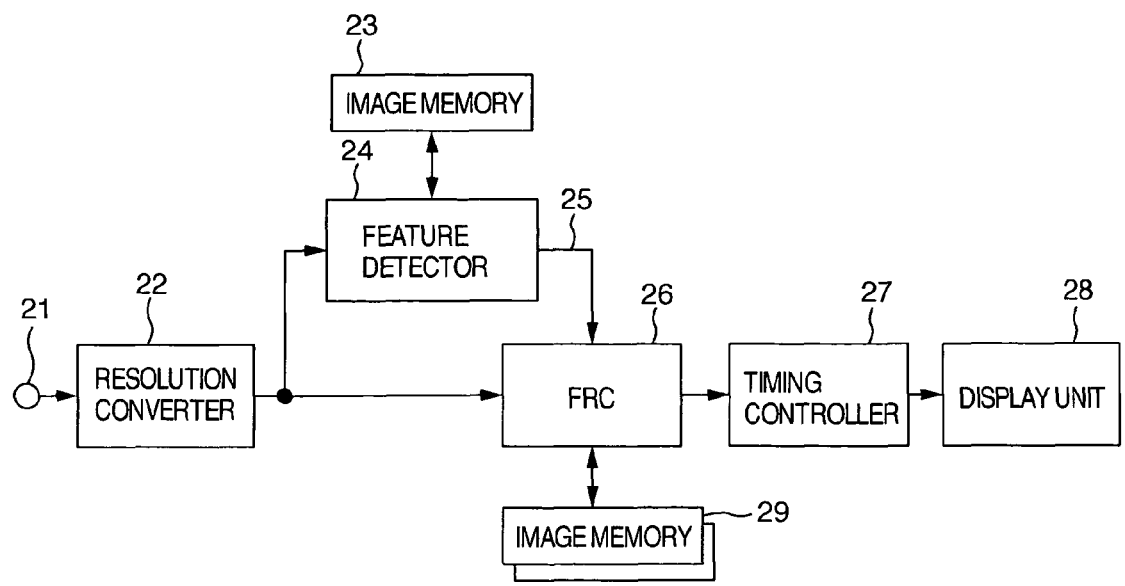
FIG. 2 is a diagram showing a configuration example in a first embodiment of the present invention.

In FIG. 2, for example, a television signal, or an image signal reproduced by a DVD player or an HDD player is input to an input unit 21. The input image signal has a predetermined frame rate such as a frame rate of 60 Hz. An image signal input to the input unit 21 is input to a resolution converter 22, and subjected to expansion/compression processing to produce an image format that conforms to the number of horizontal dots and the number of vertical dots of the display unit 28. For example, if the definition of the input image signal is 640×480 and the number of dots in the display unit 28 is 1920×1080, expansion processing is conducted on the input image signal so as to make the definition of the input image signal equal to 1920×1080. The image signal subjected to the expansion/compression processing is input to a feature detector 24 which is an information acquisition unit for acquiring information concerning the image signal, and a frame rate converter (also referred to as FRC hereafter) 26.

The feature detector 24 is connected to an image memory 23 which stores an image signal corresponding to at least two frames. The feature detector 24 detects a feature of the input image signal, i.e., a motion in the image by using contents stored in the image memory 23. For example, the feature detector 24 calculates a difference between a current frame image and a one-frame preceding image stored in the image memory 23, and detects a motion amount from the result. The difference is found, for example, as described below. First, a luminance signal at each pixel in the current frame image is compared with a luminance signal at a pixel in the preceding frame image that is in the same spatial position as the pixel in the current frame image to find a difference in luminance signal at each pixel. Subsequently, the difference in the luminance signal is found for all pixels in one frame. Its accumulated value is regarded as the difference between the frames, i.e., the motion amount. Here, the difference is found for every pixel in one frame. Alternatively, the difference may be found by taking a block having a predetermined number of pixels as the unit. For example, it is also possible to divide one frame into blocks each having 16×16 pixels and find a difference between blocks that are in the same spatial position of the current frame image and the preceding frame image. A difference between pixels or blocks that are only in the central part of the frame image may be found. The feature detector 24 calculates the number of frames corresponding to the motion amount obtained as described above, and outputs the number of frames to the FRC 26 as a number of frames specifying signal 25. The relation between the detected motion amount and the number of display panels specified by the number of frames specifying signal 25 (the frame rate of the image actually displayed by the display unit 28) will now be described with reference to FIG. 3.

Figure 3:
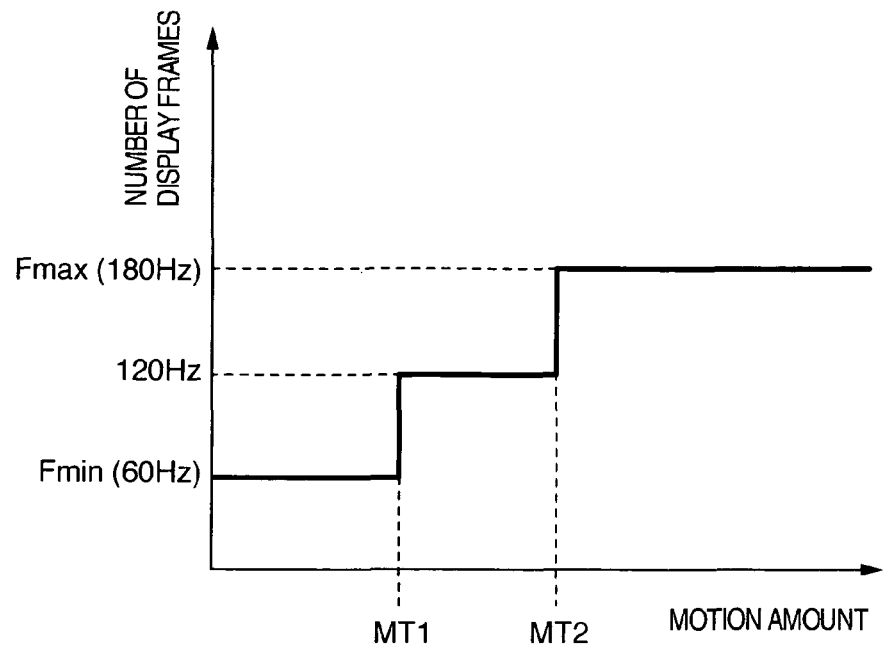
FIG. 3 is a diagram showing a relation between a detected motion amount and the number of display frames.

When the detected motion amount is less than a first predetermined value MT1, the number of display frames becomes a lowest value Fmin. The lowest value Fmin is the same value as 60 Hz which is the frame rate of the input image signal. This is because it becomes easy for human eyes to recognize flicker if the frame rate is 60 Hz or below. In the present embodiment, therefore, the lowest value Fmin in the number of display frames is set equal to 60 Hz, and even a still picture is displayed at 60 Hz. When the detected motion amount is greater than the first predetermined value MT1 and less than a second predetermined value MT2, the number of display frames becomes 120 Hz as shown in FIG. 3. In addition, when the detected motion amount is greater than the second predetermined value MT2, the number of display frames becomes 180 Hz as shown in FIG. 3. In the present embodiment, 180 Hz is set as a highest value Fmax of the frame rate, and this is set so as to correspond to a limit value of the drive frequency in the display unit 28. In the present example, an example in which the frame rate is converted to three stages has been described. As a matter of course, the frame rate may be converted to two stages. FIG. 3 shows characteristics in which the number of display frames increases stepwise as the motion amount increases. Alternatively, rectilinear characteristics may also be used.

In the configuration that outputs the number of frames specifying signal 25 every frame of the input image signal, there is a possibility that the frame rate conversion will be conducted even when a motion has occurred only in several frames. Therefore, it is desirable to form a configuration that outputs the number of frames specifying signal 25 when, for example, motions in the image exceeding the first predetermined value MT1 have been detected consecutively over, for example, approximately several to ten frames.

Referring back to FIG. 2, the FRC 26 converts the frame rate of the input image signal according to the number of frames specifying signal 25 output from the feature detector 24, and outputs a resultant image signal. For example, if the number of frames specifying signal 25 indicates 120 in the period of the large-motion range 13 shown in FIG. 1, the FRC 26 up-converts the frame rate of the input image signal to 120 Hz and outputs a resultant signal in the period. Therefore, the FRC 26 can output an output signal having a plurality of frame rates depending upon the motion in the image, with respect to an image signal representing the same certain contents. The FRC 26 is connected to an image memory 29 which stores an image signal corresponding to at least two frames. The FRC 26 calculates a motion vector from the image signal corresponding to two frames stored in the image memory 29, and generates an interpolation frame. And the FRC 26 conducts up-conversion on the frame rate of the input image signal by conducting frame rate conversion processing of inserting the interpolation frame into the frame sequence of the input image signal. By the way, the FRC 26 has a function of storing the number of frames specifying signal 25 used one frame before, in the image memory 29 or a different memory.

Figure 4:
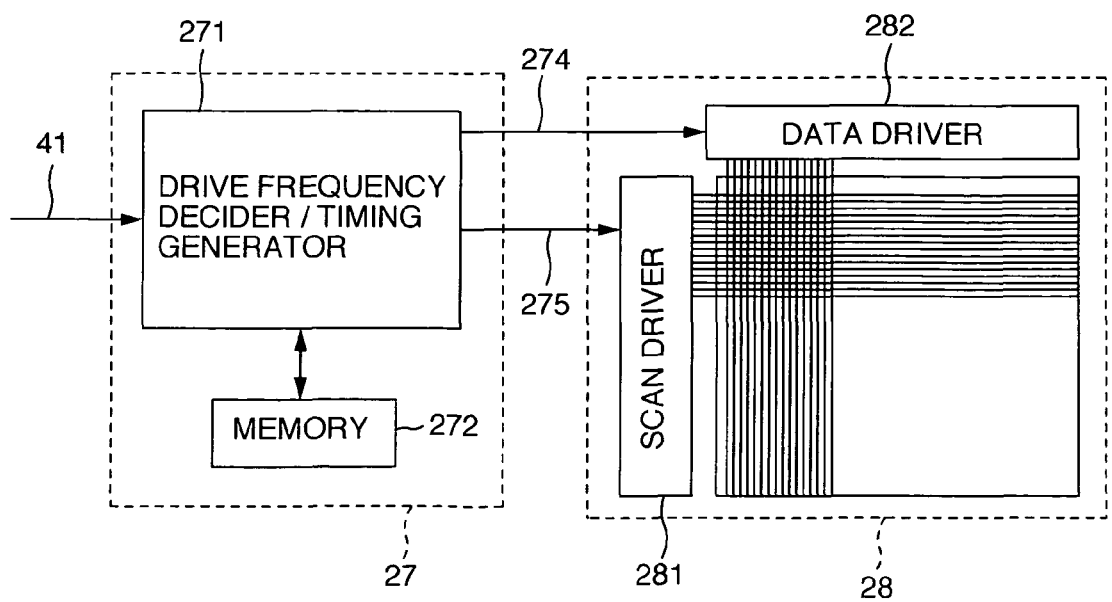
FIG. 4 is a diagram showing an example of a timing controller 27 and a display unit 28.

The signal thus converted in frame rate by the FRC 26 is supplied to a timing controller 27 coupled to a drive circuit in the display unit 28. The timing controller 27 generates a timing signal for displaying the image signal converted in frame rate and supplied from the FRC 26, in the display unit 28. A configuration example of the timing controller 27 is shown in FIG. 4. In the present example, an LCD (liquid crystal panel) is used as the display unit 28.

In FIG. 4, the timing controller 27 includes a drive frequency decider/timing generator 271 and a memory 272. The drive frequency decider/timing generator 271 judges a drive frequency required to drive the output signal on the basis of a video control signal 270 supplied from the FRC 26 and output together with the image signal subjected to frame rate conversion. On the other hand, the image signal subjected to the frame rate conversion is stored temporarily in the memory 272. Thereafter, the drive frequency decider/timing generator 271 generates various timing signals 275, and reads out the image signal stored in the memory 272. And the drive frequency decider/timing generator 271 outputs the image signal thus read out to the liquid crystal panel serving as the display unit 28, as a data signal 274 together with the timing signals 275. The reason why the output signal supplied from the FRC 26 is stored temporarily in the memory 272 is that data should be read out at a frequency depending upon the judged drive frequency. In other words, the drive frequency decider/timing generator 271 has a function of reading out the image signal from the memory 272 at timing of the judged drive frequency.

On the other hand, the display unit 28 includes a scan driver 281 for scanning horizontal lines successively in the vertical direction and a data driver 282 for supplying data associated with the image signal to each pixel in the display unit 28. The timing signals 275 are input to the scan driver 281 and horizontal lines in the display unit 281 are scanned successively in the vertical direction according to timing determined by the timing signals 275. The data signal 274 is input to the data driver 282. The data driver 282 holds the data signal 274 over one horizontal period, and supplies it to a scanned horizontal line. The data signal in the data driver 282 is updated every horizontal period. As a result of this operation, an image based upon the data signal supplied from the data driver 282 is formed on a horizontal line of the display unit 28 scanned by the scan driver 281. As a result of repeating this over one frame period, an image of one frame is formed on the display unit 28.

By the way, the drive frequency decider/timing generator 271 may include a time integration circuit which operates so as to change over the drive frequency when a change in drive frequency has continued over a predetermined time, in order to hold down frequency variations in the drive frequency.

Figure 5:
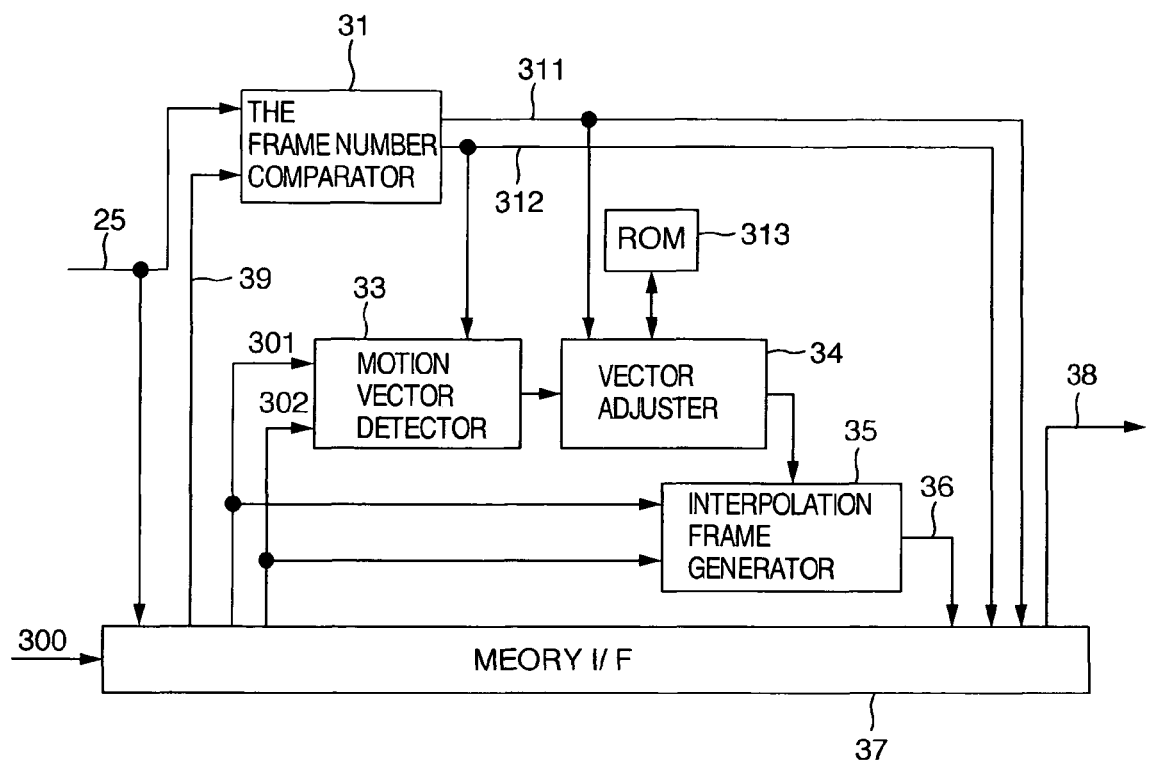
FIG. 5 is a diagram showing a concrete example of an FRC 26 according to a first embodiment.

Details of the frame rate converter 26 will now be described with reference to FIG. 5. In FIG. 5, a frame number comparator 31 acquires the number of frames specifying signal 25 at the present time output from the feature detector 24, and acquires a number of frames specifying signal 39 of one frame before stored in the image memory 29 or a different memory via a memory I/F 37. And the frame number comparator 31 compares the current number of frames specifying signal 25 with the preceding number of frames specifying signal 39, and outputs a display frame number signal 311 and a rate decision signal 312.

Here, the current number of frames specifying signal 25 is denoted by FP, and the preceding number of frames specifying signal 39 is denoted by FB. When FP>FB, the frame number comparator 31 outputs "1" as the rate decision signal 312 and outputs the FP (the number of frames specified at the present time) as the display frame number signal 311. On the other hand, when FP≦FB, the frame number comparator 31 outputs "0" as the rate decision signal 312 and outputs the FB (the number of frames specified one frame before) as the display frame number signal 311.

The signal 300 from the resolution converter 22 is provided to the image memory 29 via the memory interface (I/F) 37. The image memory 29 stores at least signals corresponding to two frames, i.e. a current frame signal 301 and a one-frame preceding signal 302, which come from the resolution converter 22. When the rate decision signal 312 is "1," a motion vector detector 33 acquires the current frame signal 301 and the one-frame preceding signal 302 from the image memory 29 via the memory I/F 37. And the motion vector detector 33 detects a motion vector in the image by using the current frame signal 301 and the one-frame preceding signal 302 thus acquired. This motion vector is found by, for example, retrieving where in the current frame signal 301 a certain pixel in the preceding signal 302 has moved to. A retrieval range of, for example, 7×7 pixels around, for example, a pixel in the current frame that is in the same spatial position as a certain pixel in the preceding frame is set in the current frame. And a certain pixel in the preceding frame is compared with each of pixels (49 pixels in this example) in the retrieval range set in the current frame, individually. As a result, a straight line that couples pixels having a minimum difference is used as the motion vector of the certain pixel.

In the configuration in the present embodiment, two frames: the current frame 301 and the preceding frame 302 are used to detect the motion vector. However, this is not restrictive. For example, a configuration in which the motion vector is found by using, for example, three to four frames or more frames may be used. The motion vector detector 33 may be provided in the feature detector 24.

Figure 6:
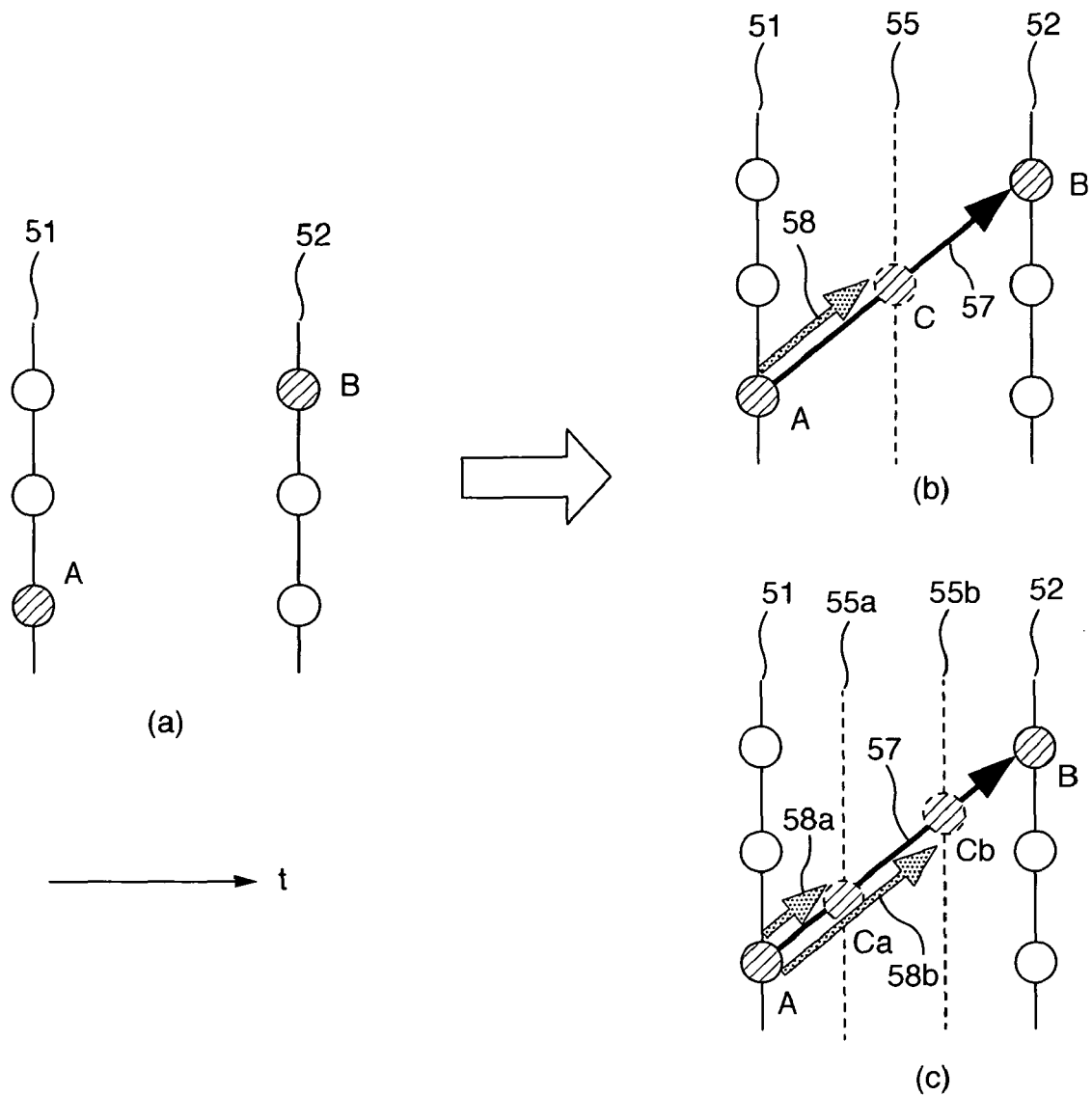
FIG. 6 is a diagram for explaining an example of vector adjustment according to a first embodiment.

The motion vector detected by the motion vector detector 33 is input to a vector adjuster 34. The vector adjuster 34 is connected to a ROM 313 which stores a vector adjustment table. The vector adjuster 34 conducts a vector adjustment by referring to contents of the table stored in the ROM 313 according to the display frame number signal 311 supplied from the frame number comparator 31. FIG. 6 shows an example of this vector adjustment.

It is supposed that a motion pixel A in a preceding frame 51 has moved to a position of a motion pixel B in a current frame 52 as shown in FIG. 6(a). In this case, the motion vector detector 33 judges that a difference between the pixel A and the pixel B is minimum, and detects a motion vector 57 which is a straight line coupling the pixels to each other. For example, if the display frame number signal 311 is 120 Hz, the frame rate is converted to twice that of the input image signal. In other words, one interpolation frame 55 is inserted between frames in the input image signal to double the frame rate as shown in FIG. 6(b). Therefore, the period of frames including the interpolation frames 55 becomes half as compared with that of the input image signal. An adjustment coefficient depending upon the frame period is stored in the ROM 313 so as to be associated with the display frame number signal 311. For example, a coefficient of "½" is associated with "120 Hz."

The vector adjuster 34 derives "½" from the ROM 313 as an adjustment coefficient associated with the display frame number signal 311 which indicates "120." And the vector adjuster 34 multiplies the motion vector 57 by the derived adjustment coefficient, and outputs an adjusted motion vector 58 obtained by halving the motion vector 57 as shown in FIG. 6(b). At this time, the pixel A has moved to an interpolation pixel C in the interpolation frame 55 in accordance with the adjusted motion vector 58.

If the display frame number signal 311 is 180 Hz, then the frame rate is converted to three times that of the input image signal. In other words, two interpolation frames 55a and 55b are inserted between frames of the input image signal as shown in FIG. 6(c). Therefore, the period of frames including the two interpolation frames 55a and 55b becomes one third of that of the input image signal. In addition, coefficients "⅓" and "⅔" are associated with "180 Hz" and stored in the ROM 313.

The vector adjuster 34 derives "⅓" and "⅔" from the ROM 313 as adjustment coefficients associated with the display frame number signal 311 which indicates "130." And the vector adjuster 34 multiplies the motion vector 57 by the derived adjustment coefficients, and outputs an adjusted motion vector 58a obtained by multiplying the motion vector 57 by ⅓ and an adjusted motion vector 58b obtained by multiplying the motion vector 57 by ⅔ as shown in FIG. 6(c). At this time, the pixel A has moved to an interpolation pixel Ca in the interpolation frame 55a in accordance with the adjusted motion vector 58a, and the pixel A has moved to an interpolation pixel Cb in the interpolation frame 55b in accordance with the adjusted motion vector 58b.

In other words, if the display frame number signal 311 has an integer times the frame rate (60 Hz) of the input image signal, then an adjusted motion vector (AMV) is represented by the following expression 1.

$$AMV(n) = (n/N+1)*MV \quad \text{(expression 1)}$$

Here, N is the number of interpolation frames inserted between two adjacent frames of the input image signal. If the display frame number signal 311 is 120, then N becomes 1. If the display frame number signal 311 is 180, then N becomes 2. MV represents the motion vector 57 detected by the motion vector detector 33. Furthermore, n is an integer of at least 1, and n is a number of an interpolation frame inserted between two adjacent frames of the input image signal. For example, when finding an adjusted vector for the interpolation frame 55a shown in FIG. 6(c), n=1 is applied. When finding an adjusted vector for the interpolation frame 55b, n=2 is applied.

In the present embodiment, the motion vector detection and adjusted vector generation are conducted with respect to all pixels in one frame. The adjusted vector thus generated is output to an interpolation frame generator 35. The interpolation frame generator 35 generates the interpolation frame by using the adjusted vector, the current frame signal and the preceding frame signal. For example in the example shown in FIG. 6(b), supposing that the pixel A moves to the interpolation pixel C in accordance with the adjustment vector 58, data at the pixel A in the preceding frame is applied as it is to the position of the interpolation pixel C in the interpolation frame 55. By conducting this with respect to all pixels, an interpolation frame is generated. The same may be said of the example shown in FIG. 6(c). Supposing that the pixel A moves to the interpolation pixel Ca in accordance with the adjustment vector 58a, data at the pixel A in the preceding frame is applied as it is to the position of the interpolation pixel Ca in the interpolation frame 55a. Supposing that the pixel A moves to the interpolation pixel Cb in accordance with the adjustment vector 58b, data at the pixel A in the preceding frame is applied as it is to the position of the interpolation pixel Cb in the interpolation frame 55b.

Figure 7:
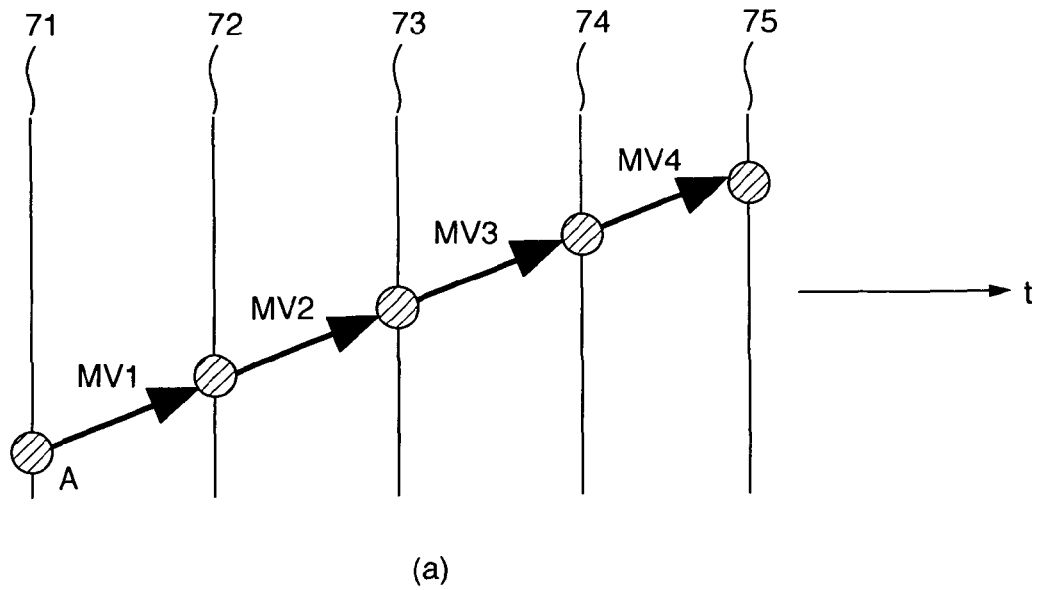
FIG. 7 is a diagram for explaining another example of vector adjustment according to a first embodiment.
Figure 7:
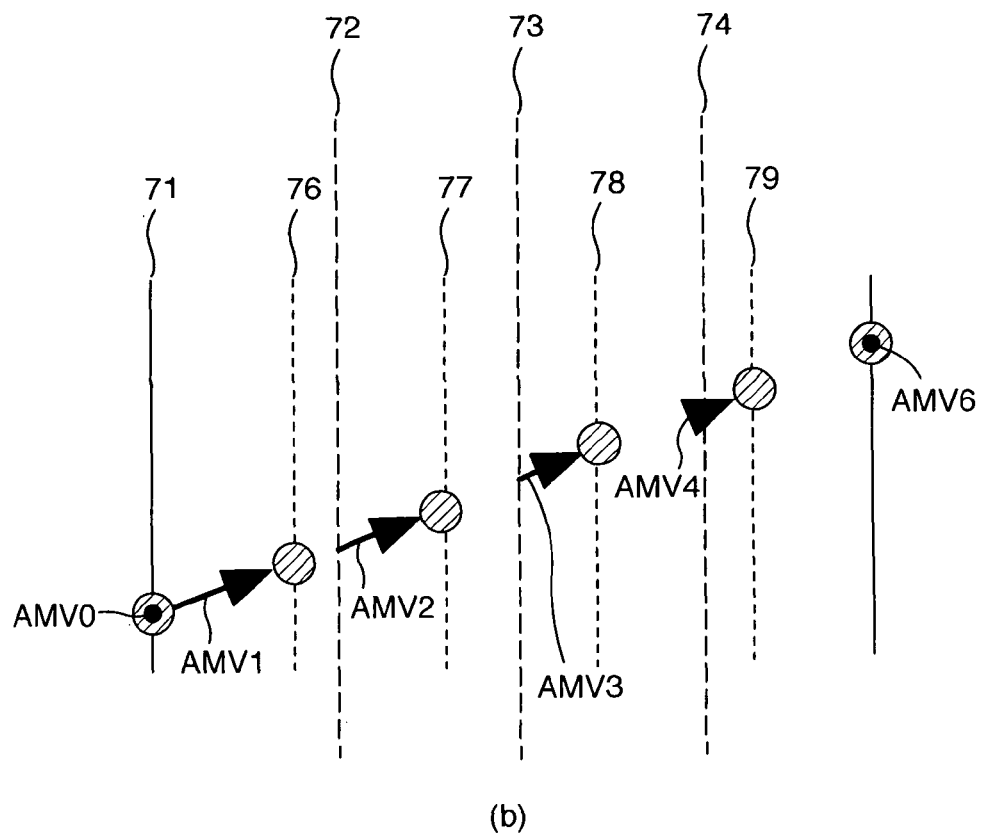

An example of vector adjustment in the case where the display frame number signal 311 does not represent an integer times the frame rate of the input image signal will now be described with reference to FIG. 7. FIG. 7 shows an example of vector adjustment in the case where the display frame number signal 311 indicates, for example, 72 Hz. It is now supposed that the pixel A in a frame 71 of the input image signal moves through frames 72 to 75 in the input image signal as shown in FIG. 7(a). Motion vectors detected between the frames 71 to 75 by the motion vector detector 33 are denoted by MV1 to MV4, respectively.

When converting 60 Hz to 72 Hz in frame rate, information corresponding to six frames in the input image signal becomes necessary during time corresponding to five frames. As shown in FIG. 7(b), therefore, the vector adjuster 34 generates AMV1 by multiplying the motion vector MV1 by ⅚, generates AMV2 by multiplying MV2 by ⅝, generates AMV3 by multiplying MV3 by ⅙, and generates AMV4 by multiplying MV4 by ⅜. The vector adjuster 34 outputs AMV0 and AMV6 having a vector value 0 as well for the first and sixth frame outputs.

In the same way as the case of the integer times, the interpolation frame generator 35 generates four interpolation frames 76 to 79 from information corresponding to five frames by using the adjusted vectors. It is also possible to store adjustment values thus obtained, in the ROM 313 and conduct vector adjustment by using the stored adjustment values if the display frame number signal 311 does not indicate an integer times the frame rate of the input image signal.

An interpolation frame 36 generated by the interpolation frame generator 35 is written into the image memory 23 via the memory I/F 37. The memory I/F 37 reads out data in number depending upon the display frame number signal 311, and outputs an FRC conversion output signal 38. If the display frame number signal 311 indicates 120, then the memory I/F 37 reads out the preceding frame signal 302 and the interpolation frame 55 shown in FIG. 6(b) from the image memory 23, and combines them with the current frame signal 301 to generate the FRC conversion output signal 38. At this time, data arrangement is controlled so as to insert the two interpolation frames 55a and 55b between the preceding frame signal 302 and the current frame signal 301.

Here, the FRC conversion output signal 38 includes a vertical synchronizing signal, a horizontal synchronizing signal, a dot clock signal and a data enable signal which control the transmission state of image data as the video control signal described with reference to FIG. 4, besides image data.

If the rate decision signal is "0," then the above-described motion detection processing and interpolation frame generation processing are not conducted, but the input image signal is used as it is as the FRC conversion output signal 38.

The FRC conversion output signal 38 is displayed on the display unit 28 by the above-described processing. A large-motion scene is displayed at a high frame rate. A small-motion scene is displayed at the same rate as that of the input image signal.

In the above-described example, the frame rate of a display image with a small motion is set equal to the same frame rate as that of the input image signal. When the motion is small, however, the input image signal may be converted to a frame rate that is lower than that of the input image signal to display the image. For example, if the motion is small, then the feature detector 24 may output 20 (Hz) as the number of frames specifying signal 25 and the FRC 26 may conduct processing of thinning frames of the input image signal every other frame to reduce the frame rate to one third.

Figure 8:
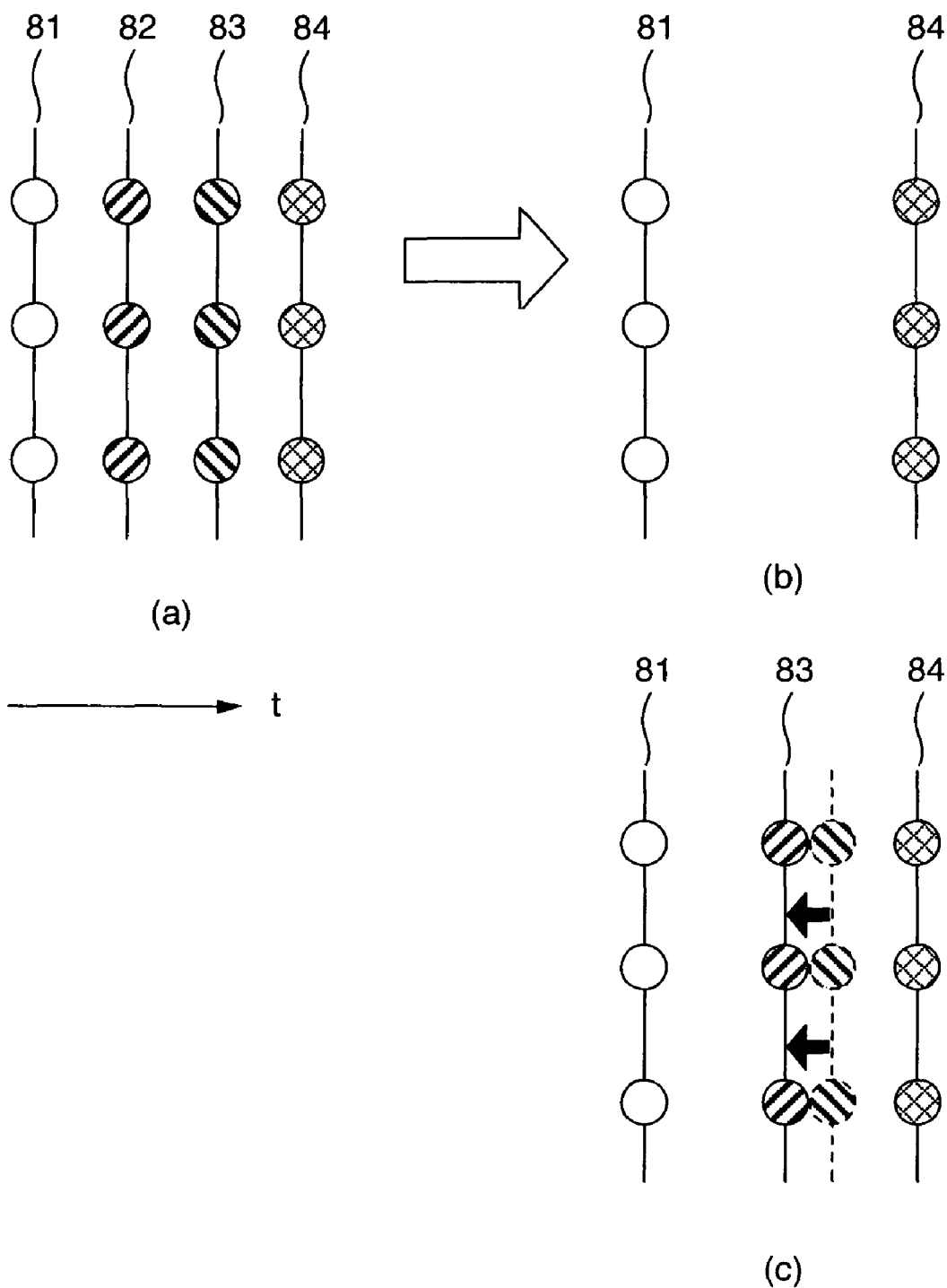
FIG. 8 is a diagram showing an example of a frame thinning method.

An example of the thinning method will now be described with reference to FIG. 8. It is now supposed that first to fourth frames which are consecutive in time are input as shown in FIG. 8(a). For example, if the display frame number signal 311 indicates ⅓ of the frame rate of the input image signal, then a second frame 82 and a third frame 83 are thinned as shown in FIG. 8(b). If the display frame number signal 311 indicates ⅔ of the frame rate of the input image signal, then the second frame 82 is thinned and readout timing of the third frame 83 is advanced as shown in FIG. 8(c). In this case, it is also possible to thin the third frame 83 and put off readout timing of the second frame. If the display frame number signal 311 indicates a frame rate that is equal to the frame rate of the input image signal, then the image signal is output at the original frame rate.

The FRC 26 may always up-convert the frame rate to 120 Hz regardless of whether the motion is large, and conduct thinning on the up-converted signal when the motion is small.

In the present embodiment, it becomes possible to vary the frame rate according to the feature of the input image and view the video image at a frame rate adapted to the image motion amount and scene, as heretofore described. Furthermore, the frame rate is varied according to the motion amount. When displaying a still image having no motions, therefore, the drive frequency is lowered by lowering the frame rate. As a result, it becomes possible to reduce the power consumption.

2. Second Embodiment

Figures 9, 10:
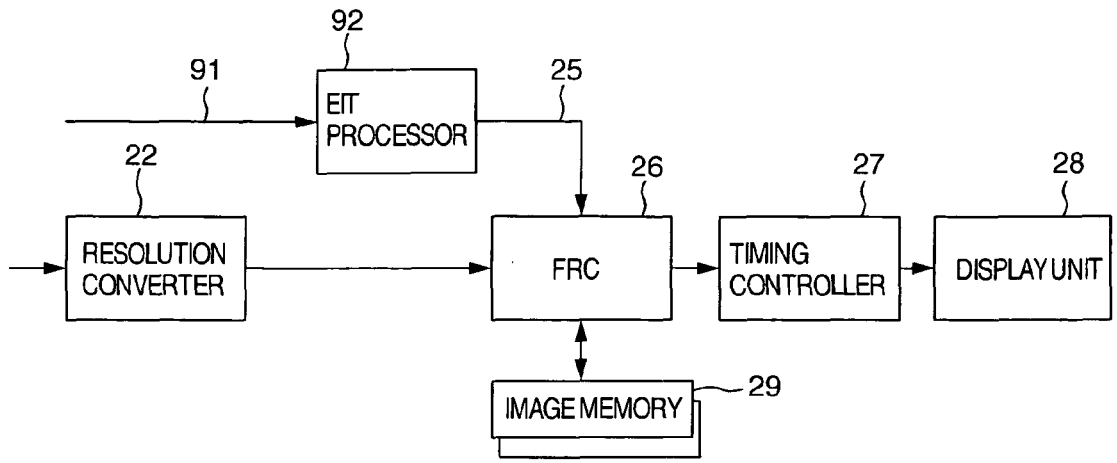
FIG. 9 is a diagram showing a configuration example in a second embodiment of the present invention.
FIG. 10 is a diagram showing an example of a table which indicates correspondences between program genres and motion amounts used in a second embodiment.

FIG. 9 is a block diagram showing a configuration example of an image processing apparatus according to a second embodiment of the present invention. The same components as those in the first embodiment shown in FIG. 2 are denoted by like reference numerals, and description of them is omitted.

The present embodiment differs from the first embodiment in that frame rate conversion is conducted according to genre information of the program. According to the present embodiment, it is possible to view the video image at an optimum frame rate according to the genre of the program such as sports or news.

In BS/ CS/ digital terrestrial television broadcasting, program information (such as a program name, program contents, a program broadcasting day, program broadcasting start time, program broadcasting lasting time, a broadcasting channel, and a program genre code) called EIT (Event Information Table) is superposed on the television broadcast signal and sent out, besides video/audio/data broadcast. A BS/ CS/ digital terrestrial television broadcast receiver provides users with an electronic program table function by utilizing the EIT sent from the broadcasting station.

In accordance with a feature of the present embodiment, the frame rate conversion is conducted by utilizing the EIT. Hereafter, operation of a part in which the present embodiment differs from the first embodiment will be described. Besides the input image signal serving as a television signal, EIT data 91 is input to the apparatus shown in FIG. 9. An EIT processor 92 serving as an information acquisition unit discriminates a genre of a program that corresponds to the input image signal by using the input EIT data 91. And the EIT processor 92 generates the number of frames specifying signal 25 which depends upon the discriminated genre, and outputs the number of frames specifying signal 25 to the FRC 26.

Specifically, the EIT processor 92 retains a table as shown in FIG. 10, and generates the number of frames specifying signal 25 associated with the genre of the program by using a 1-byte program genre code used in a content descriptor in the EIT. In the table, "small" in the motion amount is associated with "news & information" and so on in the program genre, "medium" in the motion amount is associated with "variety" and so on in the program genre, and "large" in the motion amount is associated with "sport" and so on in the program genre. And the number of frames is determined with reference to the table and the characteristics shown in FIG. 3. Here, "small" in the motion amount shown in FIG. 10 means a motion amount that is at most the first predetermined value MT1 shown in FIG. 3. "Medium" in the motion amount means a motion amount in the range between the first predetermined value MT1 and the second predetermined value MT2. "Large" in the motion amount means a motion amount that is at least the second predetermined value MT2.

For example, if the program genre code in the received EIT is "news & information," its motion amount is "small" as shown in FIG. 10 and it is at most the first predetermined value MT1 in this example. With reference to FIG. 3, therefore, 60 Hz is selected as the number of frames specifying signal 25. In the same way, in the case of "variety," the motion amount is "medium" as shown in FIG. 10 and consequently 120 Hz is selected as the number of frames specifying signal 25 by referring to FIG. 3. In the case of "sport," the motion amount is "large" as shown in FIG. 10 and consequently 180 Hz is selected as the number of frames specifying signal 25 by referring to FIG. 3.

Thus, in the present embodiment, it is possible to make the frame rate greater than that of the input image signal in the case of a sport program or a movie which is comparatively large in motion and make the frame rate the same as that of the input image signal in the case of a news program which is relatively small in motion. According to the present embodiment, therefore, a program can be viewed at a frame rate suitable for image contents.

By the way, in the example shown in FIG. 10, motion amounts are classified into three stages: large, medium and small. Alternatively, the motion amounts may be classified with finer numerical values. The number of frames may be described directly in the column in which the motion amount is described, in the table shown in FIG. 10. In that case, it is not necessary to use the characteristics shown in FIG. 3. In the table shown in FIG. 10, program genres are classified into thirteen kinds. As a matter of course, however, the classification is not restricted to this. For example, it is also possible to further provide sub-kinds under each of the thirteen main-kinds and set a motion amount or the number of frames for each of the sub-kinds.

3. Third Embodiment

Figure 11:
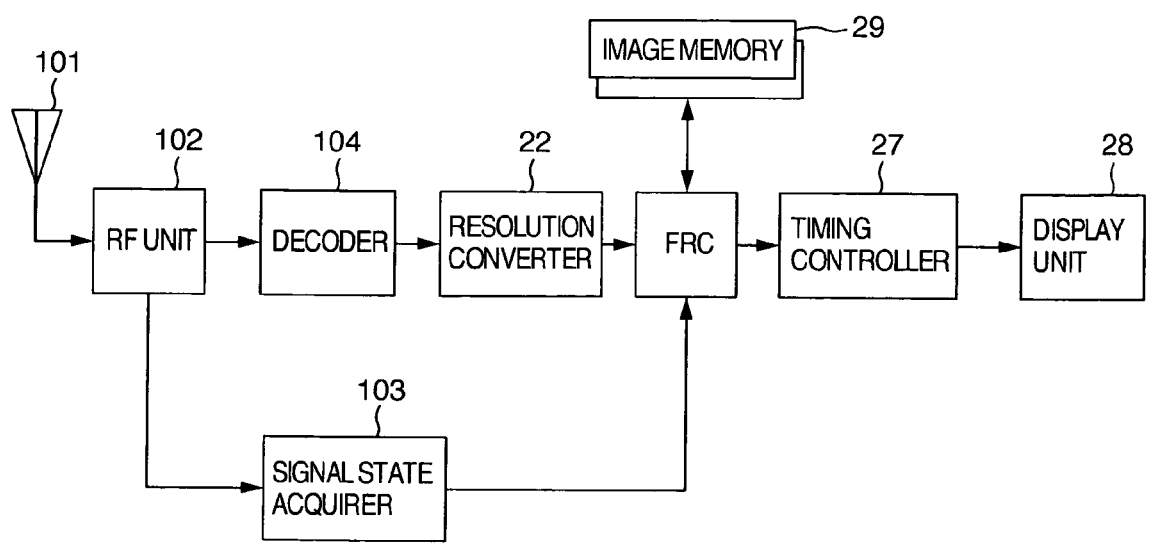
FIG. 11 is a diagram showing a configuration example in a third embodiment of the present invention.

FIG. 11 shows a configuration example of an image processing apparatus according to a third embodiment of the present invention. The present embodiment will now be described by taking a portable terminal device as an example of the image processing apparatus. The same components as those in the first embodiment shown in FIG. 2 are denoted by like reference numerals, and description of them is omitted.

In recent years, television broadcasting for portable terminals called "1-segment broadcasting" has made it possible to view a digital broadcast by using a portable terminal such as a portable telephone. The present embodiment is suitable for the application to such a portable terminal. In radio image data communication, the present embodiment alleviates unpleasant feeling during contents viewing by lowering the image frame rate when the throughput falls because of a poor receiving state or the encoding error rate (transmission bit error rate) is high.

Hereafter, operation of a part in which the present embodiment differs from the first embodiment will be described. With reference to FIG. 11, a radio wave signal containing an image signal such as 1 segment broadcasting is first received by using an antenna 101. The received radio wave signal is input to an RF unit 102. The RF unit 102 converts the received radio wave signal to a baseband signal, and outputs the baseband signal to a decoder 104. The decoder 104 demodulates the baseband signal, and outputs a resultant signal to the resolution converter 22 shown in FIG. 2.

In addition, the present embodiment includes a signal state acquirer 103 serving as an information acquirer. The signal state acquirer 103 calculates or acquires a throughput (transfer rate) which indicates the receiving state of the received image signal or the transmission bit error rate. Operation in the present embodiment conducted when the throughput is used as the signal state will now be described.

The signal state acquirer 103 compares the calculated throughput with a predetermined value. If the throughput is less than the predetermined value, the signal state acquirer 103 outputs the number of frames specifying signal 25 for lowering the frame rate of the input image signal. For example, if the frame rate of the input image signal is 60 Hz and the throughput is less than the predetermined value, the signal state acquirer 103 outputs the number of frames specifying signal 25 to convert the frame rate to 30 Hz. The FRC 26 converts the image to that having a frame rate depending upon the number of frames specifying signal 25, and displays a resultant image on the display unit 28 via the timing controller 27.

Operation in the present embodiment conducted when the transmission bit error rate is used as the signal state will now be described. The signal state acquirer 103 calculates an error rate of received information by using an error correction code added to data which is obtained by decoding in the decoder 104. As this error correction code, for example, a CRC code or a Reed-Solomon code can be mentioned. In addition, the signal state acquirer 103 compares the calculated transmission bit error rate with a predetermined value. If the transmission bit error rate is greater than the predetermined value, then the signal state acquirer 103 outputs the number of frames specifying signal 25 for lowering the frame rate of the input image signal. For example, if the frame rate of the input image signal is 60 Hz and the transmission bit error rate is greater than the predetermined value, the signal state acquirer 103 outputs the number of frames specifying signal 25 to convert the frame rate to 30 Hz. The FRC 26 converts the image to that having a frame rate depending upon the number of frames specifying signal 25, and displays a resultant image on the display unit 28 via the timing controller 27.

Thus, in the present embodiment, a device that is conducting radio video data communication converts the frame rate according to its signal state (throughput or transmission bit error rate). As a result, it is possible to alleviate user's unpleasant feeling brought about by video image freezing which is caused by a poor receiving state of the image signal.

Heretofore, the present embodiment has been described by taking a portable terminal device as an example. However, the image processing apparatus in the present embodiment is not restricted to the portable terminal device. For example, even in an image display apparatus having a function of receiving an image signal by radio, the present embodiment can be applied in the same way. The present embodiment has been described supposing that the transmission medium of the image signal is a radio. As a matter of course, however, the present embodiment can be applied even if wired transmission is used.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image processing apparatus comprising:
an input unit to which an image signal having a predetermined frame rate is input;
an information acquirer for acquiring information concerning the input image signal; and
a frame rate converter for converting the frame rate of the input image signal and outputting a resultant signal, wherein:
the information acquirer detects a motion amount in the input image signal as the information concerning the input image signal,
the frame rate converter conducts a first frame rate conversion processing to generate an output signal having a first frame rate which is higher than the frame rate of the input image signal, when the detected motion amount is at least a first predetermined value, and
the frame rate converter conducts a second frame rate conversion processing to generate an output signal having a second frame rate which is higher than the first frame rate, when the motion amount detected by the motion detector is at least a second predetermined value which is greater than the first predetermined value.

2. The image processing apparatus according to claim 1, wherein the frame rate converter conducts frame rate conversion processing to generate interpolation frames by using a frame signal of the input image signal, insert the interpolation frames into a frame sequence of the input image signal, and thereby obtain an output signal having a frame rate higher than that of the input image signal.

3. The image processing apparatus according to claim 1, wherein the frame rate of the input image signal is 60 Hz, the first frame rate is 120 Hz, and the second frame rate is 180 Hz.

4. An image processing apparatus comprising:
an input unit to which an image signal having a predetermined frame rate is input;
an information acquirer for acquiring information concerning the input image signal; and
a frame rate converter for converting the frame rate of the input image signal and outputting a resultant signal, wherein:
the information acquirer acquires genre information of a program corresponding to the input image signal as the information concerning the input image signal, and
the frame rate converter conducts the frame rate conversion processing according to the acquired genre information of the program.

5. An image processing apparatus comprising:
an input unit to which an image signal having a predetermined frame rate is input;
an information acquirer for acquiring information concerning the input image signal; and
a frame rate converter for converting the frame rate of the input image signal and outputting a resultant signal, wherein:
the information acquirer acquires information concerning a signal state of the input image signal as the information concerning the input image signal, and
the frame rate converter conducts the frame rate conversion according to the information concerning the signal state.

6. The image processing apparatus according to claim 5, wherein the information concerning the signal state contains information of a throughput or transmission bit error rate of the input image signal.

7. The image processing apparatus according to claim 6, wherein the information concerning the signal state is acquired from outside of the image processing apparatus.

8. An image processing apparatus comprising:
an input unit to which an image signal having a predetermined frame rate is input;
an information acquirer for acquiring information concerning the input image signal; and
a frame rate converter for converting the frame rate of the input image signal and outputting a resultant signal, wherein the frame rate converter conducts the frame rate conversion of the input image signal on the basis of the information of the input image signal acquired by the information acquirer;
a display unit; and
a drive frequency changeover unit for changing over a drive frequency of the display unit according to a frame rate of an output signal of the frame rate converter.

9. An image processing apparatus comprising:
an input unit to which an image signal having a predetermined frame rate is input;
a motion detector for detecting a motion in the input image signal;
a frame rate converter for conducting frame rate conversion processing to generate interpolation frames by using a frame signal of the input image signal, insert the interpolation frames into a frame sequence of the input image signal, and thereby obtain an output signal having a frame rate higher than that of the input image signal; and a display unit for displaying an image on the basis of the output signal of the frame rate converter, wherein:

if the motion detected by the motion detector is smaller than a predetermined value, the frame rate converter does not conduct the frame rate conversion processing, and if the motion detected by the motion detector is larger than the predetermined value, the frame rate converter executes the frame rate conversion processing.

10. An image processing apparatus comprising:

an information acquirer for acquiring genre information of a program;

a frame rate converter for converting a frame rate of an image signal corresponding to the program on the basis of the genre information acquired by the information acquirer; and a display unit for displaying an image on the basis of an output signal of the frame rate converter.

11. The image processing apparatus according to claim 10, wherein if the genre information acquired by the information acquirer indicates a movie or sport program, the frame rate converter outputs a signal having a first frame rate, and if the genre information acquired by the information acquirer indicates a news program, the frame rate converter outputs a signal having a second frame rate which is lower than the first frame rate.

12. An image processing apparatus comprising:

an input unit to which an image signal having a predetermined frame rate is input;

an information acquirer for acquiring information concerning a signal state of the input image signal;

a frame rate converter for converting a frame rate of the input image signal on the basis of the information of the signal state acquired by the information acquirer; and a display unit for displaying an image on the basis of the output signal of the frame rate converter.

13. The image processing apparatus according to claim 12, wherein the information concerning the signal state contains information of a throughput or transmission bit error rate of the input image signal.

* * * * *